(12) United States Patent
Reeves et al.

(10) Patent No.: US 8,280,369 B1
(45) Date of Patent: Oct. 2, 2012

(54) CONTROLLING APPLICATION MODES ON A MOBILE DEVICE

(75) Inventors: Raymond Emilio Reeves, Olathe, KS (US); Michael P. McMullen, Leawood, KS (US); Ryan Alan Wick, Punta Gorda, FL (US); John Marvin Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 463 days.

(21) Appl. No.: 12/352,891

(22) Filed: Jan. 13, 2009

(51) Int. Cl.
*H04W 24/00* (2009.01)

(52) U.S. Cl. ........ 455/423; 455/418; 455/419; 455/420; 455/425; 455/466

(58) Field of Classification Search .......................... None
See application file for complete search history.

(56) References Cited

U.S. PATENT DOCUMENTS

| | | | | |
|---|---|---|---|---|
| 6,311,060 B1* | 10/2001 | Evans et al. | ................ | 455/426.1 |
| 6,434,364 B1* | 8/2002 | O'Riordain | ................ | 455/67.11 |
| 7,664,238 B2* | 2/2010 | Kim et al. | ................ | 379/93.01 |
| 7,761,089 B2* | 7/2010 | Kang | ................ | 455/414.3 |
| 2003/0228866 A1* | 12/2003 | Pezeshki | ................ | 455/422.1 |
| 2004/0185785 A1* | 9/2004 | Mir et al. | ................ | 455/67.11 |
| 2004/0259553 A1* | 12/2004 | Delaney et al. | ................ | 455/445 |
| 2007/0197201 A1* | 8/2007 | Washio et al. | ................ | 455/418 |
| 2007/0232291 A1* | 10/2007 | Rathonyi et al. | ................ | 455/423 |
| 2009/0209250 A1* | 8/2009 | Huq | ................ | 455/425 |
| 2010/0137008 A1* | 6/2010 | Li et al. | ................ | 455/466 |
| 2010/0240350 A1* | 9/2010 | Ilkanaev et al. | ................ | 455/419 |

* cited by examiner

*Primary Examiner* — Rafael Pérez-Gutiérrez
*Assistant Examiner* — Suhail Khan

(57) ABSTRACT

A method for managing the application mode on a mobile device is provided. Messages containing instructions to change the application mode of a mobile device may be inspected to ensure the message conforms to security policies. The message may be modified to request a confirmation that the application mode has been changed according the instructions in the message. The delivery of the message may be ensured by overriding normal message delivery polices by repeatedly notifying the mobile device that the message is ready for download. The mobile device may update the application mode according to the instructions and send a confirmation message to a designated address.

19 Claims, 5 Drawing Sheets

CONTROLLING APPLICATION MODES ON A MOBILE DEVICE

SUMMARY

Embodiments of the invention are defined by the claims below, not this summary. A high-level overview of various aspects of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, one or more computer-readable media having computer-executable instructions embodied thereon for performing a method of activating an application test mode on a mobile device. The method includes receiving a message addressed to the mobile device. The message contains a test-mode instruction for the mobile device to activate a test mode that allows test-mode-authorized applications to run on the mobile device. The method also includes identifying the message as containing the test-mode instruction. The method also includes validating the message by comparing attributes of the message to security parameters governing messages containing test-mode instructions. The method further includes overriding standard-message-notification policies to notify the mobile device that the message is available for download until the message is downloaded by the mobile device, thereby increasing delivery reliability for messages with test-mode instructions.

In another illustrative embodiment, one or more computer-readable media having computer-executable instructions embodied thereon for performing a method of managing application modes on a mobile device. The method includes receiving a message that includes an instruction to activate a test mode. The test mode allows applications having test-mode certification to be executed on the mobile device. The applications with test-mode certification cannot be executed on the mobile device when the test mode is deactivated. The method further includes activating the test mode on the mobile device. The method also includes communicating a confirmation message that indicates the test mode has been activated.

In a third illustrative embodiment, one or more computer-readable media having computer-executable instructions embodied thereon for performing a method of managing application modes in a mobile device. The method includes receiving an SMS message that includes an instruction to activate a test mode on the mobile device. The SMS message also includes destination information to which a confirmation message should be sent. The SMS message also includes at least one instruction related to applications installed on the mobile device. The method further includes activating the test mode on the mobile device, wherein the test mode allows applications having test-mode certification to operate on the mobile device. The applications having test-mode certification cannot operate on the mobile device when the test mode is deactivated. The method also includes communicating the confirmation message that indicates the test mode has been activated.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Figure 1:
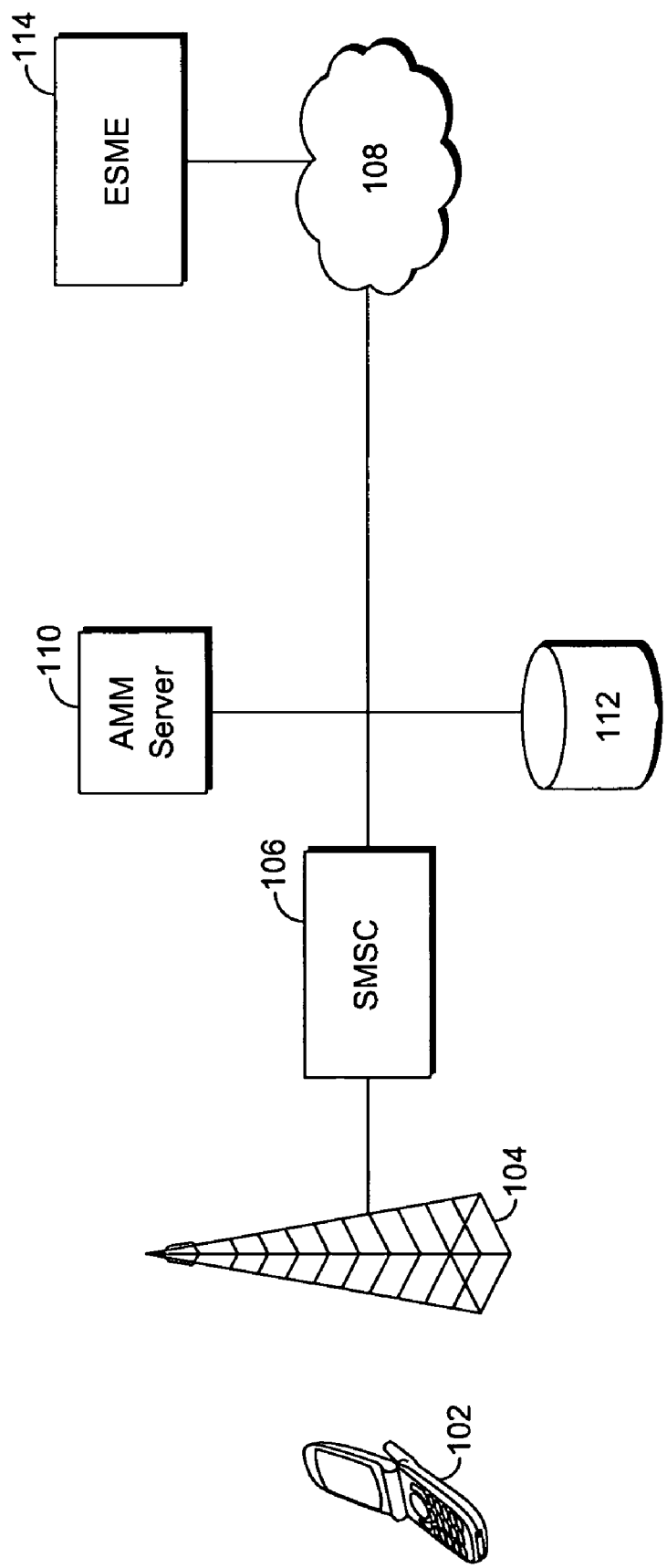
FIG. 1 is a drawing of an illustrative environment in which an embodiment of the present invention may operate.

Embodiments of the present invention provide systems and methods for managing the application modes on a mobile device. Mobile devices may have at least two different application modes including a production mode and a test mode. The production mode allows applications certified for production operation to operate when the production mode is active. The production mode may be active for everyday use of the mobile device. The test mode allows applications certified to run in test mode to operate on the mobile device when the test mode is active. The test mode and the production mode may be active at the same time.

The application modes may be changed by sending an instruction to the mobile device to activate or deactivate an application mode. Embodiments of the present invention may increase the delivery reliability of this instruction by changing the typical delivery policies at a delivery entity (e.g., SMSC) to allow the mobile device to repeatedly receive notifications indicating that the instruction is available for download. These notifications may continue until the instruction is downloaded.

In addition, the instruction may be modified to instruct the mobile device to perform additional functions that help keep track of the active application modes and programs operating on a mobile device. For example, a response request may be added to the instruction that instructs the mobile device to send a confirmation message once the application mode has been changed. Additional information may be requested, such as a list of all applications on the mobile device that are certified to be executed in test mode. In one embodiment, the mobile device is instructed to delete all applications on the mobile device that are authorized to operate in test mode.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

Embodiments of the present invention may be embodied as, among other things: a method, system, or computer-program product. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Illustrative Operating Environment

Embodiments of the present invention may be practiced in a communications network providing service to devices communicatively coupled to the communications network. An illustrative operating environment 100 that contains a few of the components within such a communications network is shown in FIG. 1. Illustrative operating environment 100 includes mobile device 102, base station 104, Short Message Service Center ("SMSC") 106, network 108, Application-Mode-Management server 110, data store 112, and External Short Message Entity ("ESME") 114. The components shown in FIG. 1 are a few of the components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and not meant to be limiting.

Mobile device 102 is depicted as a wireless communications device communicating over an air interface with base station 104. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory; one or more processors; one or more presentation components such as a display or speaker; input/output (I/O) ports; I/O components; and a power supply such as a battery. Mobile device 102 may communicate via wireless protocols, such as code division multiple access ("CDMA"), global system for mobile communications ("GSM"), or time division multiple access ("TDMA"), as well as others, to communicate with base station 104.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 is capable of receiving one or more forms of textual communications. Examples of communications that may be received include text messages, multimedia messages, emails, calendar updates, and task reminders.

The mobile device 102 may be associated with a user. For example, a text message sent to mobile device 102 would be intended for the user. The user is the ultimate recipient of communications (e.g., emails, phone calls, text messages) and media content sent to mobile device 102.

The mobile device 102 may be capable of executing computer applications. For example, the mobile device 102 may be able to execute JAVA applications that perform various functions. An application may access various capabilities of a mobile device, such as GPS location capabilities and contact information capabilities. The applications on the mobile device may be managed by an application manager. The application manager may check a list of permissions before allowing an application to execute. The application manager may also check with the list of permissions before allowing the application to access capabilities on the mobile device.

Different applications may have different permissions. For example, one application may be assigned test-mode certification and may only be able to operate if the test mode on the mobile device is active. Another application may have production mode certification and be able to operate when production mode is active. The certifications may be assigned to the applications by a service provider that provides service to the mobile device. Similarly, different applications may have different permissions to access capabilities on the mobile device. In some cases, a service provider may require the use of the mobile device to authorize the application to access capabilities of the mobile device. The user may give permission on a case-by-case basis or a perpetual permission to the application.

Base station 104 is a fixed station used for communicating with mobile device 102. Standard air interface protocols, such as code division multiple access ("CDMA"), global system for mobile communications ("GSM"), or time division multiple access ("TDMA"), as well as others, may be used by base station 104 to communicate with mobile device 102. Other network communications interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations.

Short Message Service Center ("SMSC") 106 is a network component that receives short message service ("SMS") messages from a sender and forwards the message to the recipient when the recipient is available. In one embodiment, the SMSC 106 stores the messages until the recipient mobile device is available.

Network 108 may include one or more mobile networks, one or more packet-based networks, including the Internet, and the public switched telephone network ("PSTN"). The various components within network 108 may be owned and/or operated by multiple entities, commercial or otherwise. Network 108 is configured to transmit a variety of communication formats including phone calls, emails, text messaging, faxes, instant messaging, pages, voice mails, photographs, audio files, movies, TV shows, calendar reminders, task reminders and other files containing communicative content.

Application-Mode-Management server 110 may be a high availability server capable of analyzing messages received and sent by the SMSC 106 to determine if they contain application-mode instructions. Though shown connected to only one SMSC 106, the Application-Mode-Management server 110 may be connected to multiple SMSCs. In one embodiment, the Application-Mode-Management server changes the delivery policies of the SMSC 106 for each message that contains an application-mode instruction. The delivery policies may be changed to send message-waiting notifications to the mobile device that is the intended recipient of the application-mode instruction at more frequent intervals and for a longer duration than they would otherwise be dictated by the delivery policies. These changes may increase the delivery reliability for application-mode instructions.

The Application-Mode-Management server 110 may also modify the application-mode instruction to include a confirmation request. The confirmation request may designate an address to which the confirmation should be sent. The confirmation request could be sent by the mobile device after the mobile device has changed the application mode as instructed. The application-mode instruction may also include a request to list all of the test-mode applications installed on the mobile device. In one embodiment, the application-mode instruction is modified to include a request to delete every test-mode application installed on the mobile device. The application-mode management server 110 may receive confirmations from mobile devices. The application modes of the mobile device may be tracked.

The application-mode management server 110 may perform a validation on the application-mode instruction. For example, the application-mode instruction may be blocked from transmission to the mobile device if it does not conform to a specific format. Further, the application-mode instruction may be blocked unless it is received from an approved list of senders. In addition, the application-mode instruction may be blocked if it is addressed to a mobile device on a list of mobile devices forbidden from operating in test mode.

Data store 112 may store information related to the application mode of a plurality of mobile devices. For example, the data store 112 may store the application modes currently active on each mobile device. The data store 112 may also store the dates on which the application modes were activated or deactivated. The data store 112 may also store a list of applications installed on each mobile device. The data store 112 may be accessed by one or more components including SMSC 106 and application-mode management server 110. Data store 112 may store the application mode information in any number of data structures including a relational database.

External Short Message Entity ("ESME") 114 is a combination of hardware and software for sending, receiving, and storing text messages. The hardware aspect includes a computing device that includes a CPU, short-term memory, long-term memory, and one or more network interfaces. A network interface is used to connect to a LAN, WAN (including the Internet), or other variety of communication network, such as network 108. The network interface to the WAN or LAN could be wired, wireless, or both. Software allows the ESME 114 to communicate with other computers connected to a common network through the network interface. The software facilitates sending, receiving, and storing text messages. The software may also provide security and authentication functions. The above description of hardware and software is illustrative only; many other features of the ESME 114 were not listed so as to not obscure embodiments of the present invention.

In one embodiment, the ESME 114 generates a test-mode instruction for a mobile device in response to receiving input from a user of the mobile device requesting activation of the test mode. The user may communicate with the ESME 114 through an interface presented over the Internet. In another embodiment, the ESME may be contacted through a call center or other means.

Figure 2:
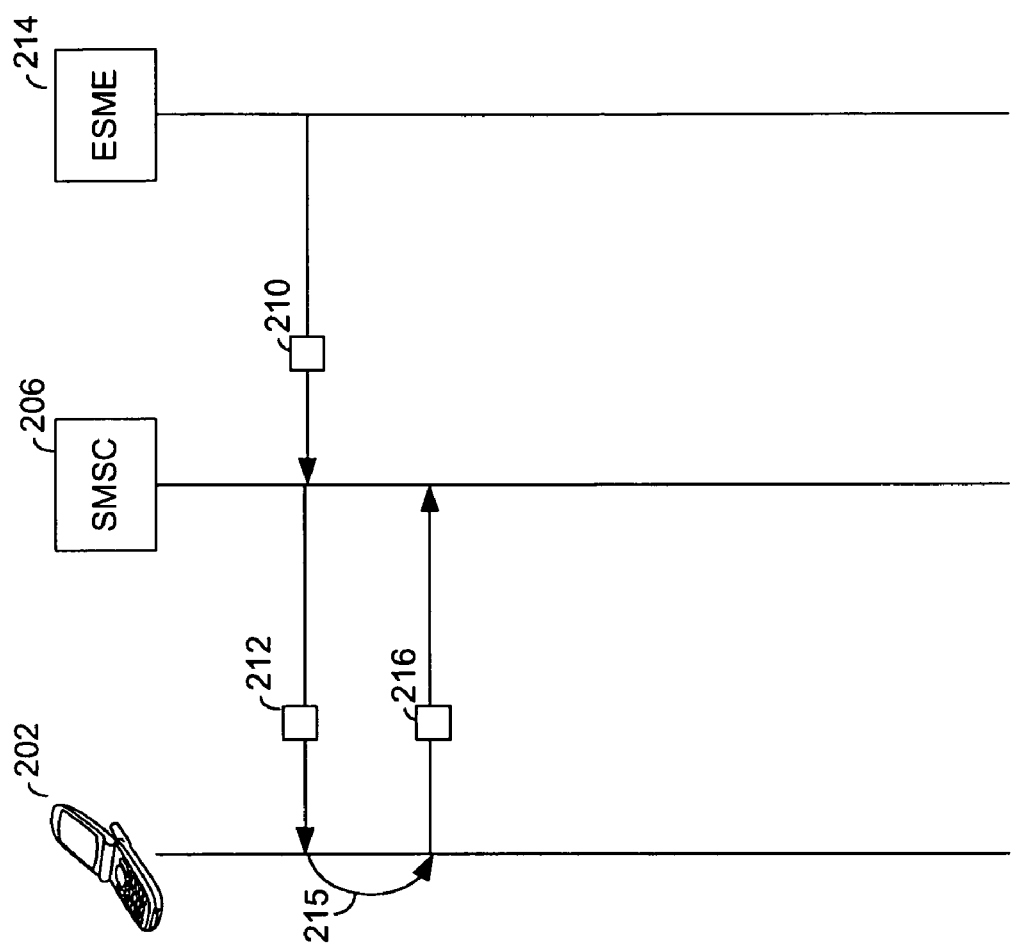
FIG. 2 is a drawing illustrating communications occurring between a mobile device and an SMSC during management of an application mode on the mobile device, in accordance with an embodiment of the present invention.

Turning now to FIG. 2, communications occurring between a mobile device 202 and an SMSC 206 during management of an application mode on the mobile device 202 are shown, according to an embodiment of the present invention. The mobile device 202 may be similar to the mobile device 102 that was described previously with reference to FIG. 1. The SMSC 206 may be similar to the SMSC 106 that was described previously with reference to FIG. 1. Similarly, the ESME 214 may be similar to the ESME 114 that was described previously with reference to FIG. 1.

Initially, message 210 is sent from the ESME 214 to the SMSC 206. Message 210 is addressed to the mobile device 202. For example, message 210 may be addressed to an MDN associated with mobile device 202. Message 210 may be an SMS message. Message 210 includes an instruction to activate a test mode on the mobile device 202. A test mode allows applications certified to operate in a test mode to be executed. The message may also include a key code that authorizes the mobile device 202 to activate the test mode as well as other information typically found in a text message. The ESME 214 may generate message 210 in response to reviewing a request from the user of the mobile device 202 to activate the test mode.

The message 210 may be evaluated by a component associated with the SMSC 206. While at the SMSC 206, the message 210 may be validated to confirm that the message 210 conforms to a designated format. The message 210 may also need to originate from a group of acceptable origination addresses. The message 210 may be modified by the SMSC 206 to include a confirmation request for the mobile device 202. The confirmation request asks the mobile device 202 to provide a confirmation message once the test mode has been activated. This modified message 212 is then sent from the SMSC 206 to the mobile device 202. Upon receiving the message 212, the mobile device 202 activates 215 the test mode. Once the test mode is activated, the mobile device 202 sends a confirmation message 216 to the SMSC 206. The SMSC may forward the confirmation message 216 to a component responsible for tracking the test-mode-activation status of the mobile device 202.

Figure 3:
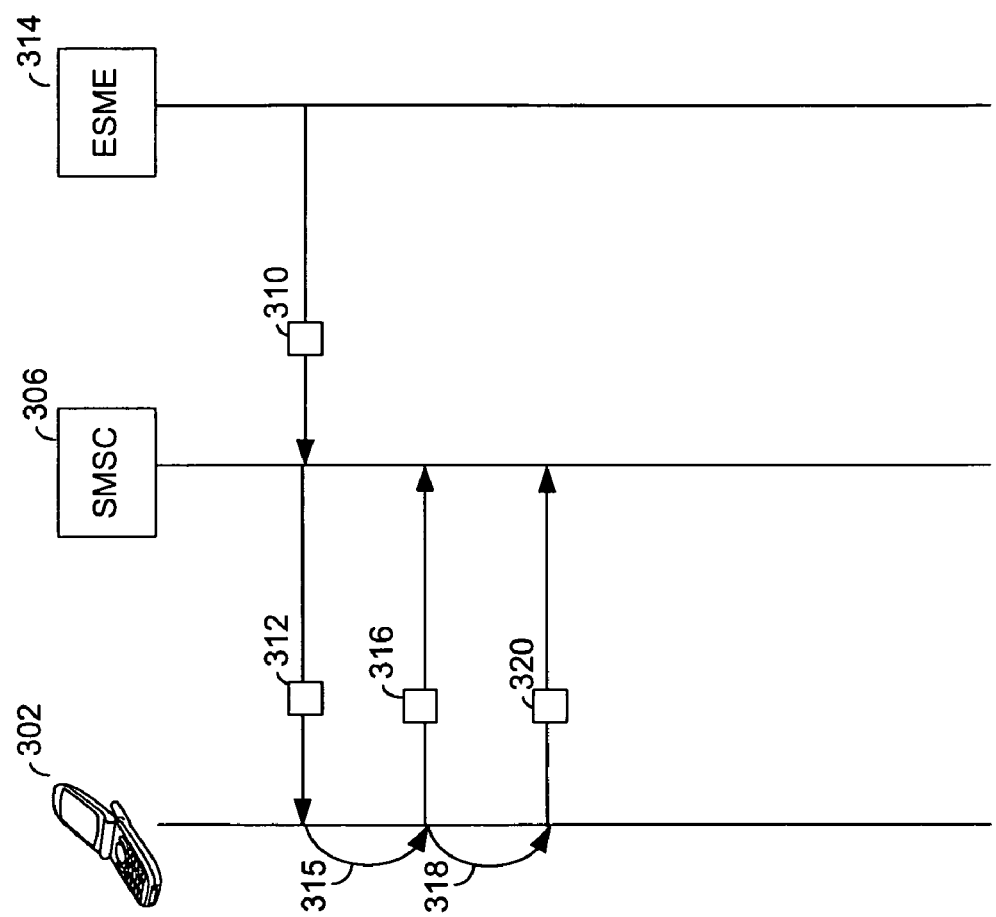
FIG. 3 is a drawing illustrating communications occurring between a mobile device and an SMSC during management of an application mode on a mobile device, in accordance with an embodiment of the present invention.

Turning now to FIG. 3, communications occurring between a mobile device 302 and an SMSC 306 during management of an application mode on the mobile device 302 are shown, according to an embodiment of the present invention. The mobile device 302 may be similar to the mobile device 102 that was described previously with reference to FIG. 1. The SMSC 306 may be similar to the SMSC 106 that was described previously with reference to FIG. 1. Similarly, the ESME 314 may be similar to the ESME 114 that was described previously with reference to FIG. 1.

Initially, the message 310 is sent from the ESME 314 to the SMSC 306. The message 310 may be similar to the message 210 described previously with reference to FIG. 2. Upon receiving the message 310, the SMSC 306 modifies the message 310 to include a request to list each application installed on the mobile device 302 that is certified to run in a test mode. The message 310 may also be modified to include a confirmation request. The message 312 is then communicated from the SMSC 306 to the mobile device 302. Upon receiving the message 312, the mobile device 302 activates 315 the test mode. Upon activating 315 the test mode, the mobile device 302 communicates a confirmation message 316 to the SMSC 306. The confirmation message 316 may be forwarded by the SMSC to an address specified in the message 312. In addition to activating 315 the test mode, the mobile device 302 may generate 318 a list of applications that are installed on the mobile device 302 and are certified to operate in test mode. A message 320, containing a list of applications installed on the mobile device 302 is communicated to the SMSC 306. The SMSC 306 may forward message 320 to an address designated in the message 312.

Figure 4:
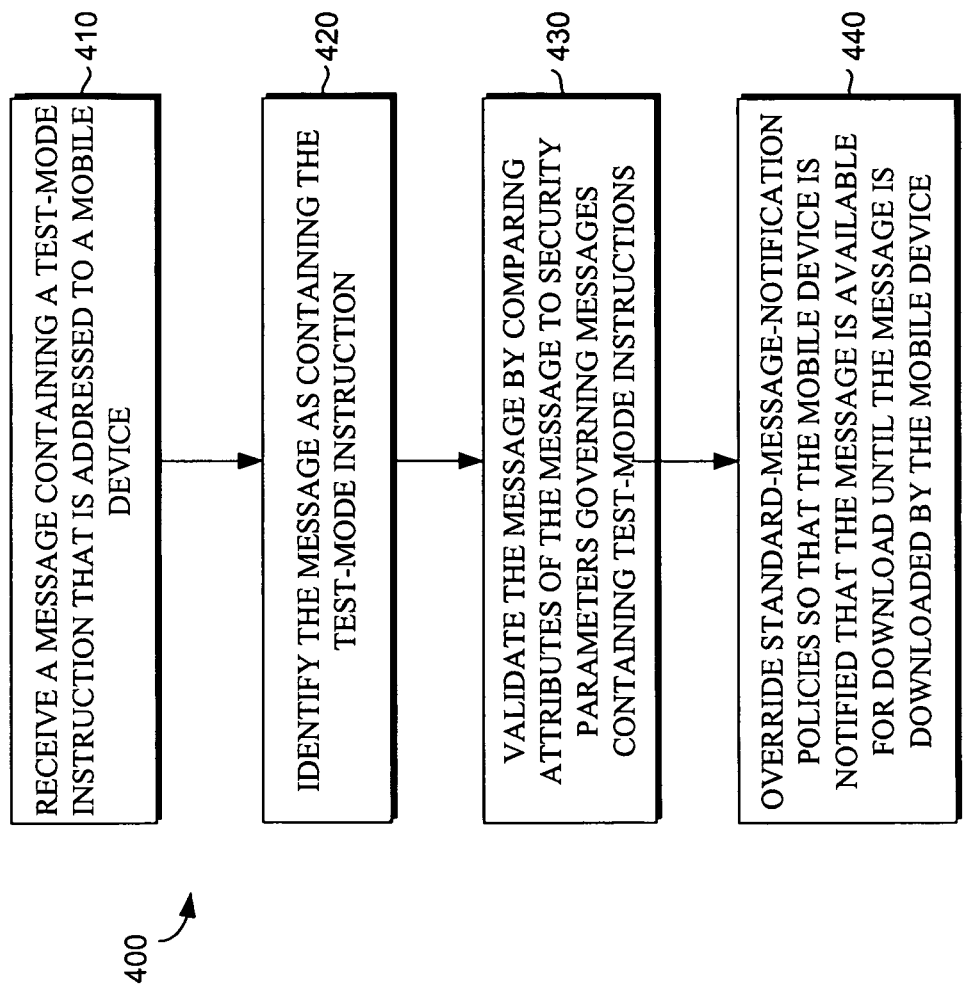
FIG. 4 is a flow chart showing a method of activating an application test mode on a mobile device, in accordance with an embodiment of the present invention.

Turning now to FIG. 4, a method of activating an application test mode on a mobile device is shown, in accordance with an embodiment of the present invention. The mobile device may be similar to the mobile device 102 described with reference to FIG. 1. At step 410, a message addressed to the mobile device is received. The message contains a test-mode instruction for the mobile device. The test-mode instruction instructs the mobile device to activate a test mode that allows test-mode-authorized applications to be executed on the mobile device. The test mode may be governed by an application management system that is responsible for policing the application permissions on the mobile device. Applications that may run on the mobile device include JAVA applications.

The application management system may enforce application permissions by prohibiting an application from executing if the active application mode does not match an application-mode certification for the application. For example, an application certified to run in test mode will not be executed if test mode is inactive. Applications that do not contain a certification may not be executed. Applications certified for production mode may operate when the phone's production mode is active. Production mode may be the standard mode under which the mobile device typically operates. Multiple application modes may be active at the same time. For example, the test mode may be active at the same time the production mode is active.

At step 420, the message is identified as containing the test-mode instruction. In one embodiment, each message received is analyzed to determine if it contains a test-mode instruction. Messages containing test-mode instructions undergo additional analysis and may be modified. Messages that do not contain the test-mode instruction are ignored. In one embodiment, the message is received by a short message service center ("SMSC").

At step 430, the message is validated by comparing attributes of the message to security parameters governing messages containing test-mode instructions. The security parameters include conforming to a designated message format, originating from a designated group of senders, and directed to a authorized group of mobile devices. For example, a message containing a test-mode instruction that originates from an unknown source may not be validated. Similarly, a message containing a test-mode instruction sent to a mobile device on which the activation of a test mode has been forbidden may not be validated. If the message is not validated, it may be deleted or otherwise blocked from transmission to the intended mobile device.

At step 440, standard-message-notification policies are overwritten to notify the mobile device that the message is available for download until the message is downloaded by the mobile device. Overwriting the standard-message-notification policies increases the delivery reliability for messages with test-mode instructions. If the standard-message-notification policies are not overwritten, the message may timeout and not be delivered if it is not downloaded within a certain time period. The notification is sent to the mobile device to allow the mobile device to download the message.

Several modifications may be made to the message before the message is allowed to be transmitted to the mobile device. For example, the message may be modified to include a request for confirmation and a confirmation address. The request for confirmation asks the mobile device to send a confirmation message when the test mode has been activated. The confirmation message should be sent to the designated confirmation address. The confirmation address may be associated with a component that tracks the test-mode-activation status for a plurality of mobile devices. Another possible modification includes adding a request to respond with a list of all applications installed on the mobile device that are certified to run in test mode. This request may also be associated with an address to which the list should be sent. A further possible modification to the message includes adding an instruction to delete all applications on the mobile device that are certified to operate in test mode.

Figure 5:
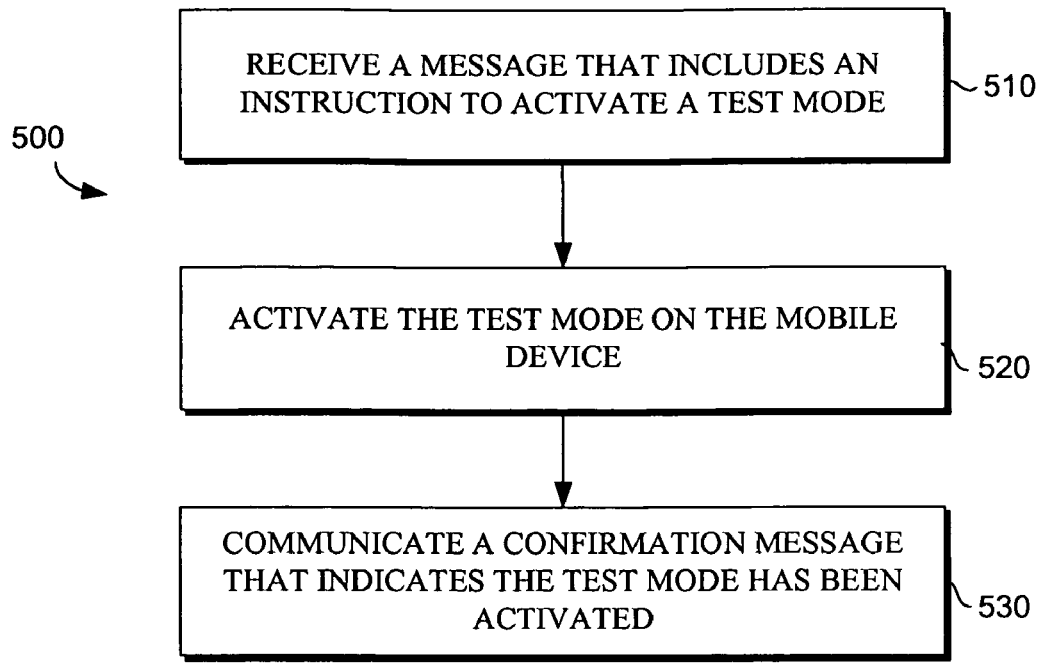
FIG. 5 is a flow chart showing a method of managing application modes on a mobile device, in accordance with an embodiment of the present invention.

Turning now to FIG. 5, a method of managing application modes on a mobile device is shown, in accordance with an embodiment of the present invention. The mobile device may be similar to the mobile device 102 described with reference to FIG. 1. At step 510, a message is received that includes an instruction to activate a test mode. As described previously, the test mode allows applications certified to run in test mode to operate on the mobile device. When the test mode is deactivated, the applications certified to run in test mode may not be executed. The message may include a key code or password granting authorization to the mobile device to activate the test mode.

At step 520, the test mode is activated on the mobile device. The test mode may be activated by changing a permission setting on the application manager governing applications installed on the mobile device. At step 530, a confirmation message that indicates the test mode has been activated is communicated. The confirmation message may be communicated to an address specified in the originally received message. In one embodiment, the message is an SMS message.

The message may include an instruction to respond with a list of applications installed on the mobile device that are certified to run in the test mode. If such an instruction is included in the message, the method may further include communicating a new message to a designated address with a list of applications installed on the mobile device that are certified to run in the test mode. The designated address may be specified in the message along with the instruction to respond with the list of applications installed on the mobile device.

The message may also include an instruction to delete all applications on the mobile device certified to operate in the test mode. If such a message is received, the mobile device may delete all applications installed on the mobile device that are certified to operate in the test mode. The message to delete all applications may include a specific authorization code.

Figure 6:
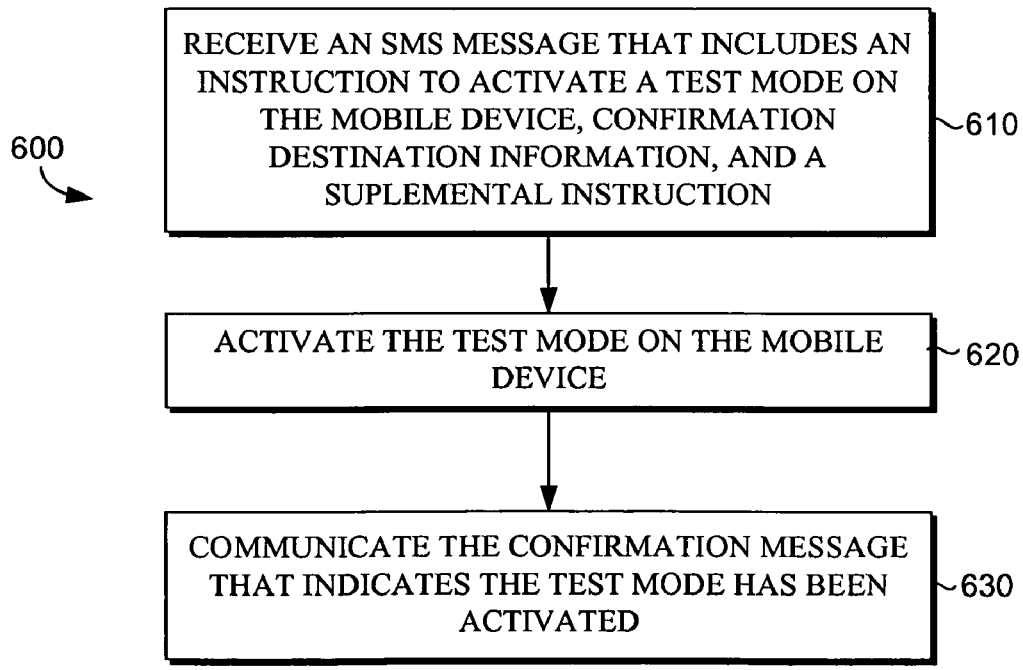
FIG. 6 is a flow chart of a method of managing application modes in a mobile device, in accordance with an embodiment of the present invention.

Turning now to FIG. 6, a method of managing application modes in a mobile device is shown, in accordance with an embodiment of the present invention. The mobile device may be similar to the mobile device 102 described with reference to FIG. 1. At step 610, an SMS message is received that includes an instruction to activate a test mode on the mobile device. The SMS message also includes destination information to which a confirmation message should be sent. The SMS message also includes at least one instruction related to applications installed on the mobile device. In one embodiment, the instructions related to applications installed on the mobile device request that the mobile device send a list of each application certified to be executed in test mode to a designated address. In another embodiment, the instruction instructs the mobile device to delete each application on the mobile device that is certified to operate in test mode. More than one instruction may be relayed in the SMS message.

At step 620, the test mode on the mobile device is activated. As described previously, the test mode allows applications having test-mode certification to operate on the mobile device. The applications that have test-mode certifications cannot operate on the mobile device when the test mode is deactivated. At step 630, the confirmation that indicates the test mode has been activated is communicated to the address designated in the SMS message. The address communicated in the SMS message may be a short encoded address. In this case, the mobile device may look up the full address in an address database that is preprovisioned on the mobile device. The confirmation message may then be sent to the full address represented by the short or encoded address. In addition to receiving a message to activate the test mode, a message with an instruction to deactivate the test mode may also be received. The deactivation message may include similar additional instructions requesting that a confirmation message be sent to a designated address, that a list of applications certified to operate in test mode is sent to a designated address, as well as an instruction to delete all applications or certain applications certified to operate in test mode. Upon receiving a message to deactivate the test mode, the test mode should be deactivated.

Many different arrangements of the various components depicted, as well as components not shown, are possible without departing from the spirit and scope of the present invention. Embodiments of the present invention have been described with the intent to be illustrative rather than restrictive. Certain features and subcombinations are of utility and may be employed without reference to other features and subcombinations and are contemplated to be within the scope of the claims. Not all steps listed in the various figures need be carried out in the specific order described.

The invention claimed is:

1. One or more nontransitory computer-readable media having computer-executable instructions embodied thereon for performing a method of activating an application test mode on a mobile device, the method comprising:
   at a network device, receiving a message addressed to the mobile device, wherein the mobile device includes one or more test-mode-authorized applications installed on the mobile device;
   at the network device, prior to sending the message to the mobile device, determining whether the message contains a test-mode instruction for the mobile device to activate a test mode, wherein the test mode allows the one or more test-mode-authorized applications to run on the mobile device;
   prior to sending the message to the mobile device, when a determination is made that the message contains the test-mode instruction, then validating the received message by comparing attributes of the message to security parameters governing messages containing test-mode instructions, wherein comparing attributes of the message to security parameters includes one or more of
      (A) determining that the message conforms to a designated message format,
      (B) determining that the message originates from a designated group of senders, or
      (C) determining that the mobile device to which the message is directed is allowed to operate in test mode; and
   overriding standard-message-notification policies to notify the mobile device that the message is available for download until the message is downloaded by the mobile device, thereby increasing delivery reliability for messages with test-mode instructions.

2. The media of claim 1, wherein the method further includes deleting the message if the attributes of the message do not conform to the security parameters.

3. The media of claim 1, wherein the message is validated only when the message is received from an approved sender.

4. The media of claim 1, wherein the method further includes analyzing each message sent to the mobile device to determine whether said each message contains test-mode instructions.

5. The media of claim 1, wherein the method further includes:
   when the message contains the test-mode instruction, then prior to sending the message to the mobile device, modifying the message to include a confirmation address, wherein the confirmation address is where a confirmation message should be sent; and
   receiving the confirmation message from the mobile device that indicates that the test mode is active in response to receiving the message.

6. The media of claim 1, wherein the method further includes:
   when the message contains the test-mode instruction, then prior to sending the message to the mobile device, modifying the message to include a request for a list of applications installed on the mobile device that are certified to run in the test mode; and
   receiving a response message that includes information identifying applications installed on the mobile device that are certified to run in the test mode.

7. One or more nontransitory computer-readable media having computer-executable instructions embodied thereon for performing a method of managing application modes on a mobile device, the method comprising:
   at the mobile device, receiving a message that includes an instruction to activate a test mode, wherein the test mode allows applications having test-mode certification to be executed on the mobile device, wherein the applications with test-mode certification cannot be executed on the mobile device when the test mode is deactivated, and wherein the message also includes
      A) a request for confirmation that the test mode is currently active, and
      B) a destination of an application-mode management server to which the confirmation should be communicated, wherein prior to having been received by the mobile device, the message was modified, based on a determination that the message contains the instruction to activate the test mode, to include the destination of the application-mode management server;
   activating the test mode on the mobile device;
   communicating to the destination a confirmation message that indicates the test mode has been activated.

8. The media of claim 7, wherein the message is an SMS message that includes a key that validates the instruction to activate the test mode to the mobile device.

9. The media of claim 7, wherein the message includes an instruction to respond with a list of applications installed on the mobile device that are certified to run in the test mode.

10. The media of claim 9, wherein the method further includes communicating a new message with the list of applications installed on the mobile device that are certified to run in the test mode.

11. The media of claim 7, wherein the message includes a destination address specifying where the confirmation message should be sent.

12. The media of claim 7, wherein the message includes an instruction to delete all applications on the mobile device certified to operate in the test mode, and wherein the method further includes deleting all of said applications certified to operate in the test mode.

13. One or more nontransitory computer-readable media having computer-executable instructions embodied thereon for performing a method of managing application modes in a mobile device, the method including:
   receiving an SMS message that includes an instruction to activate a test mode on the mobile device, wherein the mobile device includes one or more applications having test-mode certification installed on the mobile device, wherein the SMS message also includes
  A) a confirmation request for confirmation that the test mode is activated on the mobile device, and
  B) destination information for a network component to which a confirmation message indicating the test mode is activated on the mobile device should be sent, wherein prior to having been received by the mobile device, the SMS message was modified, based on a determination that the message contains the instruction to activate the test mode, to include the destination information of the network component,
wherein the network component tracks whether the test mode is active or inactive for each of a plurality of mobile devices, and wherein the SMS message includes at least one instruction related to the one or more applications having test-mode certification installed on the mobile device;
activating the test mode on the mobile device, wherein the test mode allows the one or more applications having test-mode certification to operate on the mobile device, and wherein the one or more applications having test-mode certification cannot operate on the mobile device when the test mode is deactivated; and
communicating to the network component the confirmation message indicating the test mode is activated on the mobile device, wherein the confirmation message enables tracking of whether the test mode is active or inactive on the mobile device.

14. The media of claim 13, wherein the method further includes using the destination information to look up a full address in an address list stored on the mobile device and addressing the confirmation message to the full address.

15. The media of claim 13, wherein the at least one instruction includes a request to communicate a list of all applications on the mobile device that are certified to run in test mode.

16. The media of claim 13, wherein the at least one instruction includes a request to delete all applications on the mobile device that are certified to run in test mode.

17. The media of claim 16, wherein the method further includes deleting said all applications on the mobile device that are certified to run in test mode.

18. The media of claim 13, wherein the method further includes:
  receiving a deactivation message with instructions to deactivate the test mode and send a new confirmation message;
  deactivating the test-mode on the mobile device; and
  communicating the new confirmation message that indicates the test mode is deactivated.

19. The media of claim 13, wherein the method further includes preventing test-mode applications from executing on the mobile device when the mobile device is not in test mode.

* * * * *